United States Patent
Tsutsui et al.

(10) Patent No.: US 10,493,614 B2
(45) Date of Patent: Dec. 3, 2019

(54) TOOL INCLUDING LOAD SENSOR

(71) Applicant: MAX CO., LTD., Tokyo (JP)

(72) Inventors: Tomohide Tsutsui, Tokyo (JP);
Yuusuke Ohsawa, Tokyo (JP);
Tomohiko Serita, Tokyo (JP)

(73) Assignee: MAX CO., LTD., Tokyo (JP)

( * ) Notice: Subject to any disclaimer, the term of this patent is extended or adjusted under 35 U.S.C. 154(b) by 334 days.

(21) Appl. No.: 15/354,612

(22) Filed: Nov. 17, 2016

(65) Prior Publication Data

US 2017/0144291 A1   May 25, 2017

(30) Foreign Application Priority Data

Nov. 20, 2015   (JP) ................ 2015-228223

(51) Int. Cl.
*B25F 5/00* (2006.01)
*G01L 1/22* (2006.01)

(52) U.S. Cl.
CPC ............. *B25F 5/001* (2013.01); *B25F 5/00* (2013.01); *G01L 1/2281* (2013.01)

(58) Field of Classification Search
CPC ... B25F 5/00; B25F 5/001; H01H 5/16; H02P 29/00; G01R 31/392
USPC .............. 318/3, 490; 173/20, 170, 217, 176; 324/420–424; 307/117
See application file for complete search history.

(56) References Cited

U.S. PATENT DOCUMENTS

| | | | | |
|---|---|---|---|---|
| 4,695,963 A * | 9/1987 | Sagisawa | ............... | B25J 13/081 414/5 |
| 6,424,112 B1 | 7/2002 | Schauer | | |
| 7,221,142 B2 * | 5/2007 | Murray | ................ | G01R 15/146 324/117 R |
| 7,334,648 B2 * | 2/2008 | Arimura | ................. | B25B 21/02 173/176 |
| 7,550,878 B2 * | 6/2009 | Komatsu | ................ | H01H 1/605 307/137 |
| 8,823,404 B2 * | 9/2014 | Sasaki | ............... | H01L 21/67248 250/442.11 |

(Continued)

FOREIGN PATENT DOCUMENTS

CN         101320644 A    12/2008
DE   A1-102009041878     9/2012

(Continued)

OTHER PUBLICATIONS

Extended European Search Report dated Apr. 26, 2017 in corresponding European patent application 16002441.0 (5 pages).

*Primary Examiner* — Alexander M Valvis
*Assistant Examiner* — Himchan "Aiden" Song
(74) *Attorney, Agent, or Firm* — Rothwell, Figg, Ernst & Manbeck, P.C.

(57) ABSTRACT

A tool includes a switch and a controller. The switch is configured to cause an electric component to operate. The switch includes a switch manipulation part and a load sensor. The switch manipulation part is configured to manipulate the switch. The load sensor is configured to detect a load corresponding to a pressing force according to a manipulation of the switch manipulation part. The controller is configured to correct an output corresponding to the load detected by the load sensor. The switch is configured to cause the electric component to operate based on the output corrected by the controller.

11 Claims, 10 Drawing Sheets

(56) References Cited

U.S. PATENT DOCUMENTS

| | | | |
|---|---|---|---|
| 8,901,934 B2* | 12/2014 | Namou | G01R 31/3275 324/415 |
| 2007/0279064 A1* | 12/2007 | Michael | G01R 31/2884 324/421 |
| 2008/0296140 A1 | 12/2008 | Yoshihara et al. | |
| 2012/0068633 A1* | 3/2012 | Watanabe | B25F 5/001 318/3 |
| 2012/0223663 A1 | 9/2012 | Dietl et al. | |
| 2012/0247796 A1* | 10/2012 | Mueller | B25F 5/00 173/1 |
| 2012/0299521 A1* | 11/2012 | Petersson | H02P 23/14 318/490 |
| 2013/0068491 A1* | 3/2013 | Kusakawa | B25B 21/00 173/176 |
| 2013/0105189 A1* | 5/2013 | Murthy | B25B 21/00 173/178 |
| 2013/0255981 A1* | 10/2013 | Noto | B25F 5/001 173/20 |
| 2014/0055142 A1* | 2/2014 | Klapper | G01R 27/205 324/421 |
| 2015/0231771 A1* | 8/2015 | Sakai | B25B 21/026 173/176 |
| 2015/0326216 A1* | 11/2015 | Machnicki | H03K 17/14 307/117 |

FOREIGN PATENT DOCUMENTS

| | | | |
|---|---|---|---|
| EP | A1-2639016 | | 9/2013 |
| JP | 08219856 A | | 8/1996 |
| JP | 2003057140 A | * | 2/2003 |
| JP | 2003057140 A | | 2/2003 |
| JP | 2007-220481 A | | 8/2007 |
| JP | 2014-167926 A | | 9/2014 |
| WO | WO-A2-2013-147324 | | 10/2013 |

\* cited by examiner

TOOL INCLUDING LOAD SENSOR

CROSS-REFERENCE TO RELATED APPLICATION

This application is based on and claims priority under 35 USC 119 from Japanese Patent Application No. P2015-228223 filed on Nov. 20, 2015.

TECHNICAL FIELD

The present invention relates to a tool.

BACKGROUND

In a general electric tool, a rotational speed of a motor is controlled by a user pulling a trigger provided in a grip. As the trigger, there are a stroke type trigger which performs a control by an operation amount, a load type trigger which performs a control by a magnitude of an operation load, and the like. A semiconductor, a strain gauge, or a pressure-sensitive conductive elastomer (hereinafter, referred to as a pressure-sensitive rubber) is used as a load sensor. For example, JP-A-2007-220481 discloses a pressure-sensitive conductive elastomer in which an electric resistance value is high in a non-pressure and non-deformed state, and the electric resistance value is reduced according to the increase of the load at the time of the compressive deformation so as to show conductivity.

SUMMARY

However, the electric tool adopting the load sensor described in JP-A-2007-220481 and the like has following problems. That is, there is a case where the mechanical strength of the load sensor is changed to cause deterioration (sag). When a temperature becomes high, the hardness of rubber decreases, and when a temperature becomes low, the hardness increases. Therefore, in low temperature environment, the characteristic of a resistance value with respect to a load becomes insensitive, and the rotational speed of the motor is not increased even when the load is applied. Such a characteristic of the sensor causes a problem that the output with respect to the load corresponding to a pressure operation of the user is not stabilized, and operability is degraded.

In this regard, the present invention was made to solve the above-described problems, and an object thereof is to provide a tool which can stabilize output with respect to a load.

According to one aspect of the present invention, a tool includes a switch and a controller. The switch is configured to cause an electric component to operate. The switch includes a switch manipulation part and a load sensor. The switch manipulation part is configured to manipulate the switch. The load sensor is configured to detect a load corresponding to a pressing force according to a manipulation of the switch manipulation part. The controller is configured to correct an output corresponding to the load detected by the load sensor. The switch is configured to cause the electric component to operate based on the output corrected by the controller.

According to the present invention, the stabilized output can be obtained without being affected by a characteristic of a load sensor.

DETAILED DESCRIPTION

Hereinafter, preferred embodiments of the present disclosure will be described in detail with reference to the accompanying drawings.

[Configuration Example of Electric Tool 10]

Figure 1:
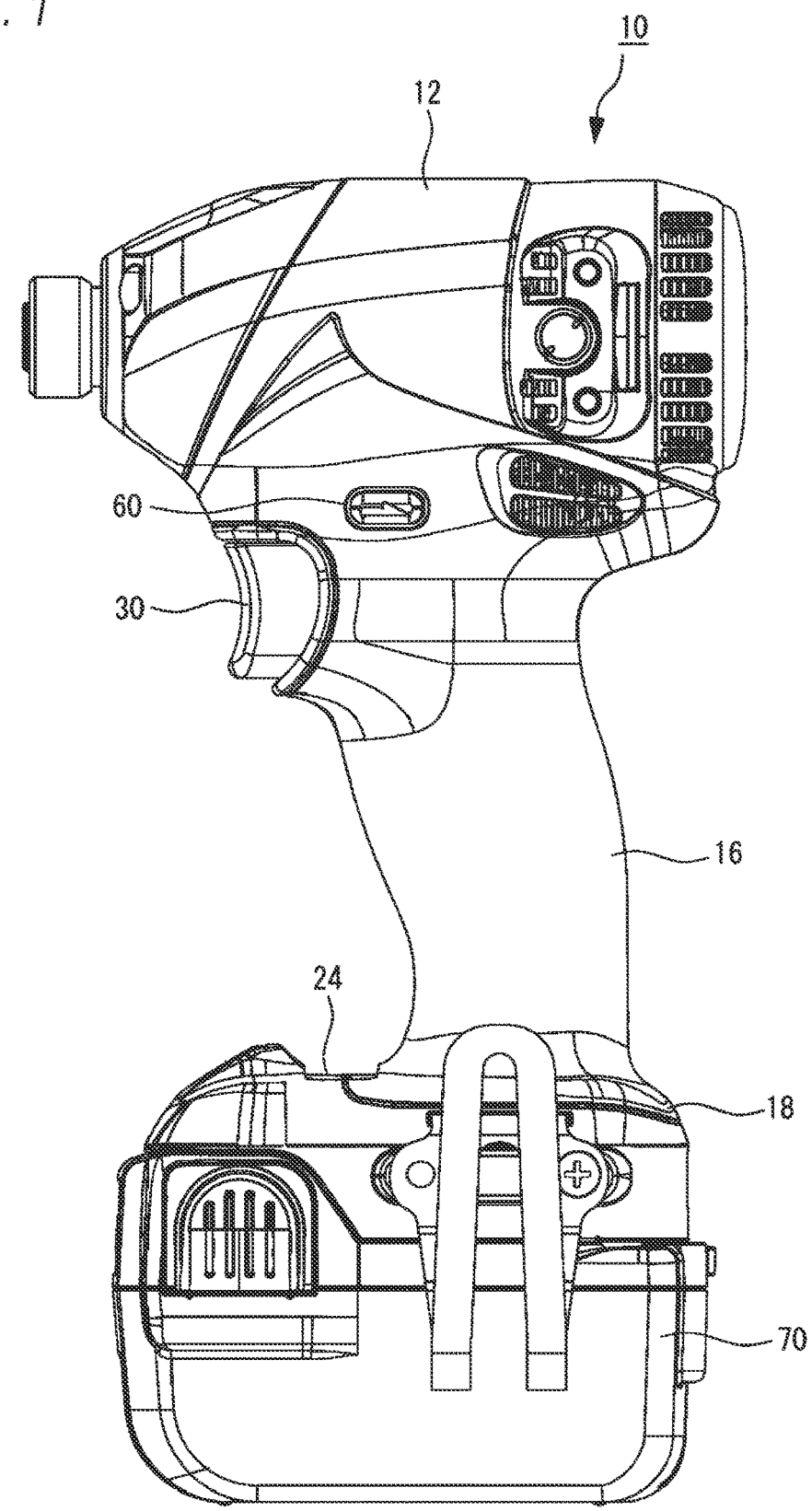
FIG. 1 is a plan view illustrating a configuration example of an electric tool according to an embodiment of the present invention.
Figure 2:
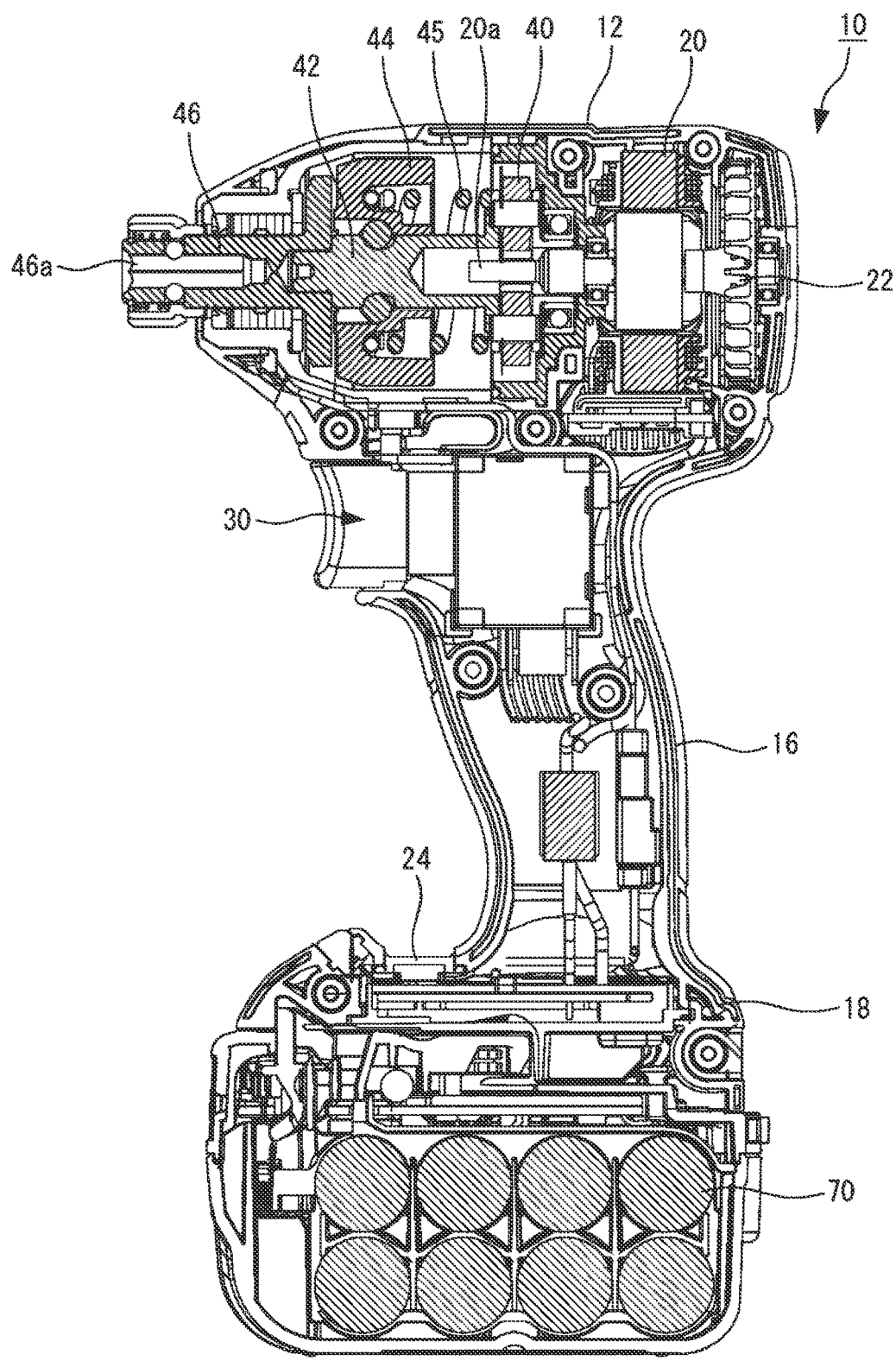
FIG. 2 is a sectional view illustrating a configuration example of the electric tool.

FIG. 1 illustrates an example of a planar configuration of an electric tool 10 according to an embodiment of the present invention. FIG. 2 illustrates an example of a sectional configuration thereof. In FIGS. 1 and 2, the left side of the drawings is set as the front side of the electric tool 10, and the right side of the drawings is set as the rear side of the electric tool 10.

The electric tool 10 according to the present invention is an impact driver having a DC brushless motor (hereinafter, referred to as a motor 20) as a driving source. As illustrated in FIGS. 1 and 2, the electric tool 10 includes a cylindrical electric tool body (housing) 12 and a grip 16 extending in a substantially vertical direction from the lower portion of the electric tool body 12. The side surface portion of the electric tool body 12 is provided with a normal/reverse switch 60 for switching the rotation of the motor 20 between positive rotation and reverse rotation.

The motor 20, a cooling fan 22, a reduction gear 40, a spindle 42, a hammer 44, and an anvil 46 are built in the electric tool body 12. The motor 20 is configured, for example, as a DC brushless motor, and is provided in the rear portion of the electric tool body 12. The motor 20 disclosed in the present invention is an example of an electric component.

The cooling fan 22 is disposed on the rear side of the motor 20, and is provided coaxially with a rotating shaft 20a of the motor 20. The cooling fan 22 rotates according to the rotation of the motor 20. The cooling fan 22 absorbs external air from an inlet port provided in the side surface portion of the electric tool body 12 to cool the motor 20, and discharges the absorbed air through an exhaust hole provided in the side surface portion of the electric tool body 12.

The reduction gear 40 is provided on the front side of the motor 20 to be connected to the rotating shaft 20a of the motor 20. The reduction gear 40 forms a planetary gear mechanism. The reduction gear 40 rotates according to the rotation of the motor 20 and reduces the rotational speed of the motor 20 to transmit the power of the motor 20 to the spindle 42.

The hammer 44 converts the rotation of the spindle 42 to the rotary striking force, and transmits the converted rotary striking force to the anvil 46. Specifically, when an external torque (screw fastening resistance) of a set torque or more is applied to an output shaft 46a (to be described later) at the time of the screw fastening motion (at the time of activation of the motor 20), the hammer 44 retreats while compressing a compression spring 45, so that the engagement of the anvil 46 and the hammer 44 in a rotation direction is temporarily released. Then, the restoring force of the compression spring 45 causes the hammer 44 to advance, and the hammer 44 strikes the anvil 46 in the rotation direction.

The anvil 46 is provided in the tip portion of the electric tool body 12, and includes the output shaft 46a on which a driver bit (tip tool, not illustrated) is mountable. When the motor 20 is driven to rotate in the state of attaching the driver bit to the output shaft 46a, the driving force of the motor 20 causes the driver bit to rotate and to be struck.

The grip 16 is a part for gripping the electric tool 10. A battery pack attaching part 18 to which a battery 70 can be attached in a mountable manner is provided in the lower portion of the grip 16. FIGS. 1 and 2 illustrate a state where the battery 70 is attached to the battery pack attaching part 18. A residual capacity gauge is provided in the battery 70 so that battery residual capacity can be recognized visually.

An operation panel 24 is provided in the upper surface portion of the portion which extends to the front side of the battery pack attaching part 18. The operation panel 24 includes a mode setting button for switching a strike mode, and the like.

A switch 30 is disposed on the front side of the upper portion of the grip 16, and is provided in a position where a forefinger is crooked when a user grips the grip 16. The rotation amount of the motor 20 can be controlled according to the pressuring motion (pull operation) of the user with respect to the switch 30.

[Configuration Example of Switch 30]

Figure 3:
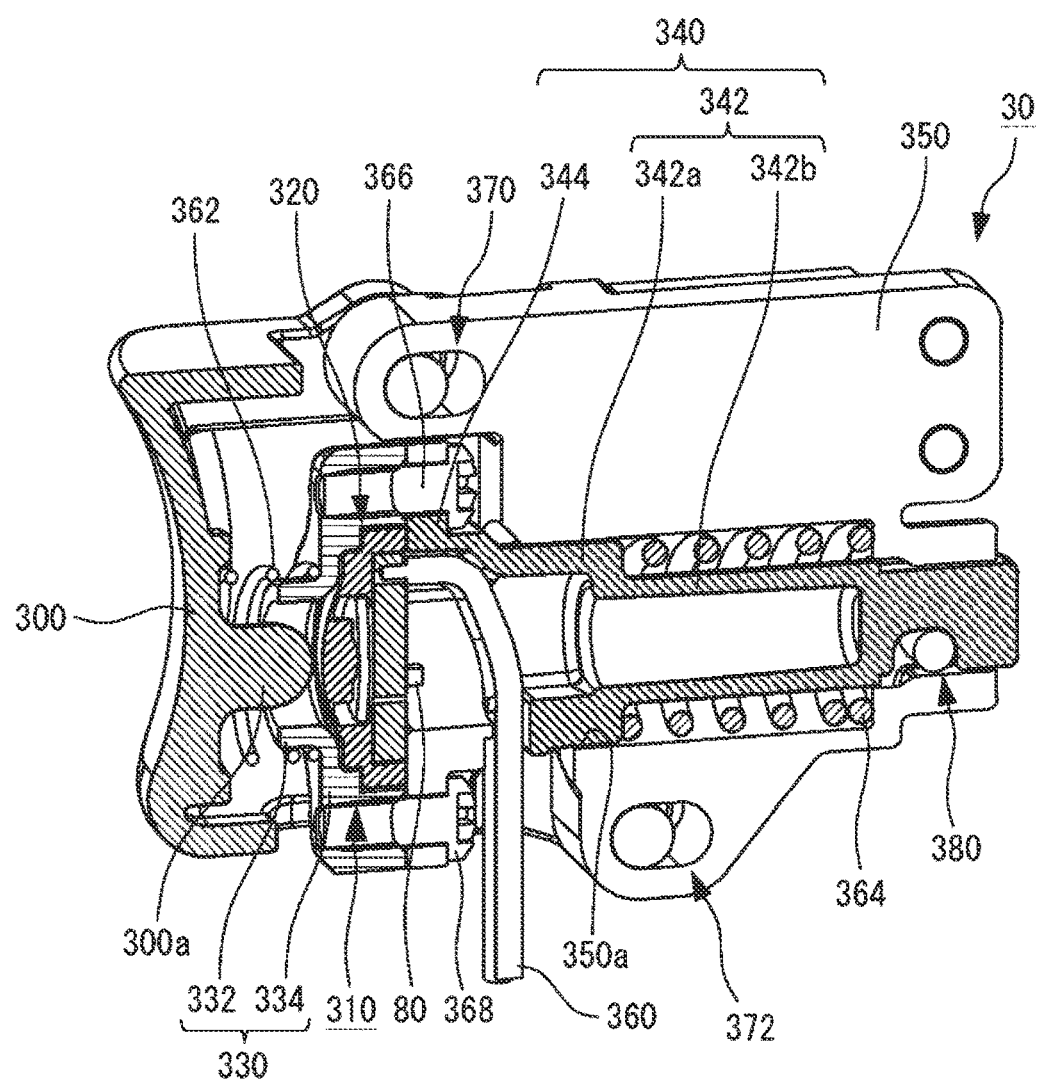
FIG. 3 is a sectional view illustrating a configuration example of a switch.
Figure 4:
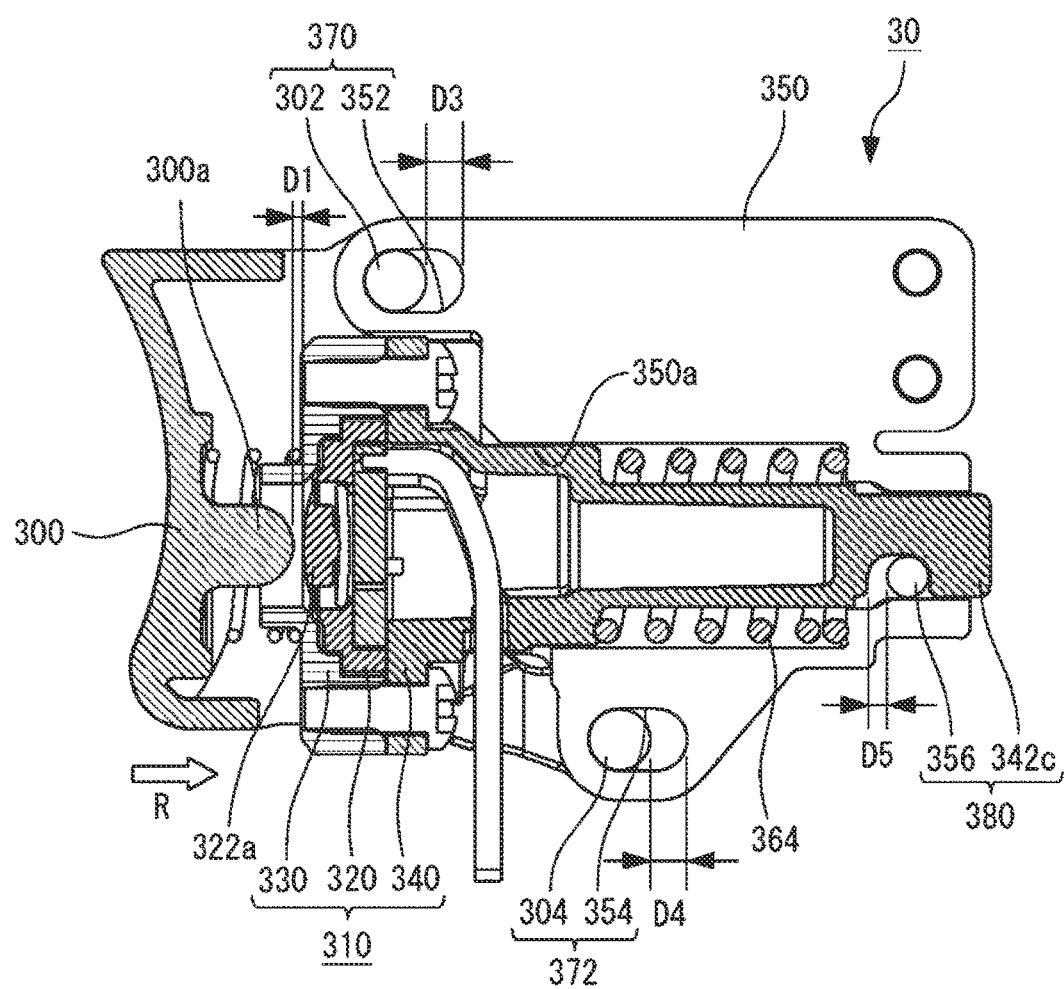
FIG. 4 is a sectional view illustrating the configuration example of the switch.

FIGS. 3 and 4 illustrate an example of a configuration of the switch 30. As illustrated in FIGS. 3 and 4, the switch 30 includes the trigger 300, a sensor unit 310, a fixing member 350, a temperature sensor (temperature measurement part) 80, and regulating parts 370, 372, and 380.

The trigger 300 is a member which is used for the user to turn on/off the electric tool 10 and to adjust the rotation amount of the motor 20. The trigger 300 is one example of a switch manipulation part. The trigger 300 has a curved front surface such that the user easily applies pressure with a finger. A protrusion 300a protruding toward the sensor unit 310 is provided in the rear surface (back surface) of the trigger 300. The protrusion 300a is moved toward the sensor unit 310 when the user performs the pressure operation on the trigger 300, and presses a load sensor 320 (to be described later). A coil spring 362 is inserted between the trigger 300 and a load sensor covering member 330 (to be described later), and biases the trigger 300 in an opposite direction to a pressing direction R.

Figure 5:
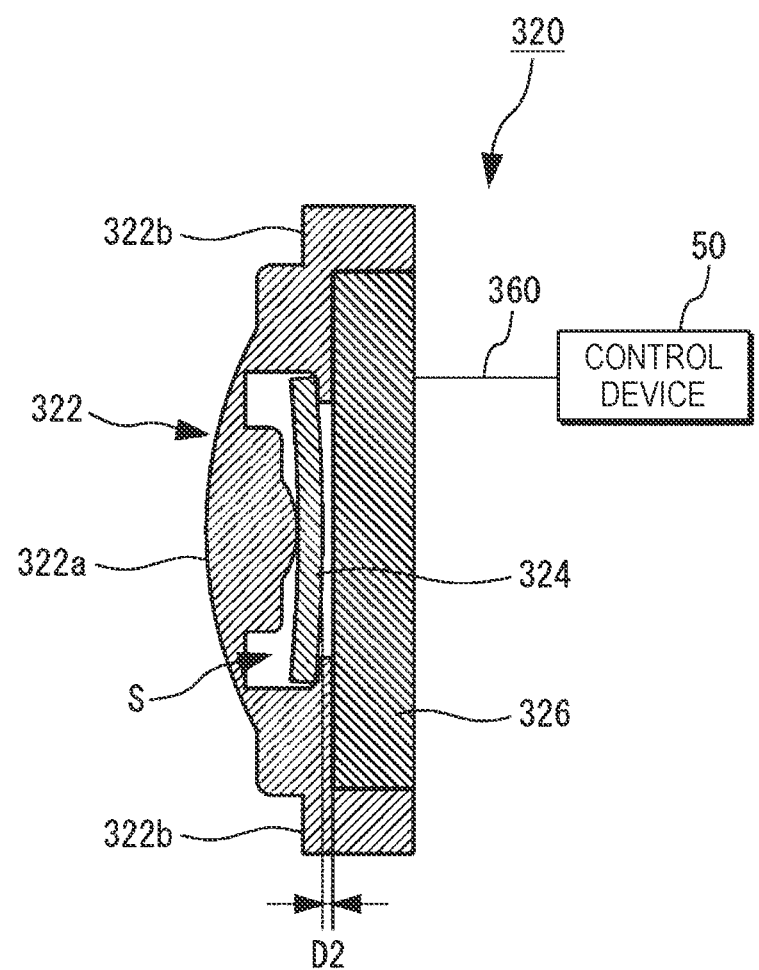
FIG. 5 is a sectional view illustrating a configuration example of a load sensor.

The sensor unit 310 includes the load sensor 320, the load sensor covering member 330, and a load sensor supporting member 340. FIG. 5 illustrates an example of the sectional configuration of the load sensor 320. As illustrated in FIG. 5, the load sensor 320 includes the sealing cover 322, a pressure-sensitive conductive elastic member 324, and a substrate 326.

The sealing cover 322 is formed, for example, of soft resin material which can be bent and deformed elastically. The sealing cover 322 includes a pressure portion 322a and a sealing portion 322b formed integrally therewith. The pressure portion 322a has a front surface side and a rear surface side, each of which protrudes in a hemispherical shape (dome shape). The protrusion on the front surface side is advanced and retreated elastically by being pressed by the trigger 300, and the protrusion on the rear surface side presses the pressure-sensitive conductive elastic member 324. The pressure portion 322a is provided to be separated by a distance D1 from the protrusion 300a of the trigger 300 in order to prevent an erroneous operation (see FIG. 4). The sealing portion 322b is provided to surround the entire circumference of the outer edge portion of the substrate 326, and has a function to secure a waterproof property in the load sensor 320.

The pressure-sensitive conductive elastic member (movable contact) 324 is disposed between the sealing cover 322 and the substrate 326, and is formed of a planar conductive member which can be bent and deformed elastically. As the conductive member, for example, a pressure-sensitive conductive member in which electric conductivity is changed according to pressure may be used in addition to a metallic conductive member. For example, a pressure-sensitive member in which conductive fine particles such as carbon, metal powders, and metal deposition powders are dispersed to a rubber material may be preferably used. The pressure-sensitive conductive elastic member 324 abuts on the substrate 326 by being bent by a pressing force received from the sealing cover 322. In this embodiment, the pressure-sensitive conductive elastic member (movable contact) 324 and the sealing cover 322 are configured in the contact state, but may be separated from each other.

The substrate 326 is formed, for example, of a material such as a glass epoxy plate, and is disposed a certain distance D2 away from the pressure-sensitive conductive elastic member 324. A plurality of conductor patterns (not illustrated) are formed on the front surface side of the substrate 326 to form fixed contacts. When the pressure-sensitive conductive elastic member 324 is compressed in the state of abutting on the conductor patterns, a resistance value is changed according to a compression load (deformation amount) so that the substrate 326 becomes conductive. An electric signal based on the conduction is output to a control device 50 (to be described later) through a wire 360 connected to the substrate 326. When the deformation amount of the pressure-sensitive conductive elastic member 324 is increased by the increase of the load, the resistance value is decreased. In this manner, it is possible to detect the resistance value with respect to the load corresponding to the pressing force of the user to the trigger 300.

Returning to FIGS. 3 and 4, the load sensor covering member 330 secures a sealing property and a waterproof property of the load sensor 320 by covering the load sensor 320. The load sensor covering member 330 includes a cylindrical portion 332, and a flange portion 334 formed integrally therewith. In the cylindrical portion 332, the pressure portion 322a is exposed so that the protrusion 300a can press the pressure portion 322a. The flange portion 334 is provided to extend outward from the outer edge of the cylindrical portion 332, and to cover the entire circumstance of the outer edge portion of the sealing cover 322.

The load sensor supporting member 340 is a member for supporting the load sensor 320, and includes a cylindrical portion 342 and a flange portion 344 formed integrally therewith. The cylindrical portion 342 is a cylindrical member including a step portion, and includes a large diameter cylindrical portion 342a and a small diameter cylindrical portion 342b connected thereto. The flange portion 344 extends from the front outer edge of the large diameter cylindrical portion 342a, and abuts on each of the flange portion 334 of the load sensor covering member 330 and the sealing portion 322b of the sealing cover 322 (see FIG. 5).

The flange portion 334 of the load sensor covering member 330 and the flange portion 344 of the load sensor supporting member 340 are fastened by screws 366 and 368 in a state where the sealing portion 322b of the sealing cover 322 is interposed therebetween. In this manner, the load sensor 320 is configured as an integral unit structure contained in the load sensor covering member 330 and the load sensor supporting member 340 (sensor unit 310), thereby securing the sealing property and the waterproof property of the load sensor 320.

The fixing member 350 is fixed to an attachment portion (not illustrated) provided in the electric tool body 12, and regulates the movement of the trigger 300 and the sensor unit 310 in the pressing direction R. The fixing member 350 includes a guide part 350a for guiding the movement of the sensor unit 310. The guide part 350a is provided in the inner circumferential surface of the fixing member 350, and contacts the outer circumferential surface of the cylindrical portion 342 so that the sensor unit 310 can move linearly in the pressing direction R. A spring 364 is inserted between the outer circumferential surface of the small diameter cylindrical portion 342b of the load sensor supporting member 340 and the inner circumferential surface of the fixing member 350. The sensor unit 310 is supported elastically by the coil spring 364.

The coil spring 364 is disposed coaxially with the load sensor 320, and is elastically deformed when a certain load or more is applied to the load sensor 320 by pressure of the user with respect to the trigger 300. In this manner, the sensor unit 310 can be configured to be movable to the fixing member 350, and the pressing force received by the trigger 300 can be accurately transmitted to the load sensor 320. Therefore, it is possible to improve the sensitivity of the load sensor 320. The coil spring 364 disclosed in the present invention is an example of an elastic member.

The temperature sensor 80 is configured, for example, as a thermistor, and is provided in the rear surface (back surface) side of the substrate 326 forming the load sensor 320. The temperature sensor 80 may measure an ambient temperature in a state where the electric tool 10 is used after turning on a power supply as well as the temperature of the load sensor 320. The ambient temperature includes, for example, an ambient temperature of the load sensor 320 in the electric tool body 12, and an environmental temperature near the electric tool body 12. In this case, it is preferable to change a place to attach the temperature sensor 80 appropriately.

As illustrated in FIG. 4, the regulating parts 370 and 372 are provided in the respective upper portion and lower portion of the inside of the switch 30, and regulate the movement distance of the trigger 300 according to the pressure of the user to be less than the maximum movement distance of the sensor unit 310.

The regulating part 370 includes a protrusion 302 provided in the trigger 300 and a long hole 352 which is provided in the fixing member 350 and extends in the pressing direction R of the trigger 300. The protrusion 302 is a columnar member protruding from the inner surface of the trigger 300 toward the fixing member 350, and is engaged to be slidable in the long hole 352. A movement distance (stroke) D3 of the protrusion 302 of the trigger 300 in the long hole 352 is less than the maximum movement distance (stroke) of the sensor unit 310 in the pressing direction R.

The regulating part 372 will be not described in detail because the regulating part 372 has the same configuration as the regulating part 370. The regulating part 372 includes a protrusion 304 and a long hole 354. The protrusion 304 is engaged to be slidable in the long hole 354. A movement distance D4 of the protrusion 304 of the trigger 300 in the long hole 354 is less than the maximum movement distance of the sensor unit 310 in the pressing direction. The movement distance D3 is the same as the movement distance D4.

The regulating part 380 is provided in the rear portion of the switch 30. The regulating part 380 prevents the sensor unit 310 from coming off from the coil spring 364, and regulates the movement amount of the sensor unit 310. The regulating part 380 includes a protrusion 356 provided in the fixing member 350, and a hook portion 342c provided in the load sensor supporting member 340.

The hook portion 342c includes a recess concave downward, and is formed integrally with the rear end portion of the load sensor supporting member 340. The protrusion 356 is a columnar member which protrudes from the inner surface of the fixing member 350 toward the load sensor supporting member 340, and is engaged to the hook portion 342c in a movable manner. A movement distance D5 of the protrusion 356 in the hook portion 342c is set to such a length that the sensor unit 310 is movable even when the stroke of the trigger 300 reaches a limit.

[Motion Example of Switch 30]

Figure 6:
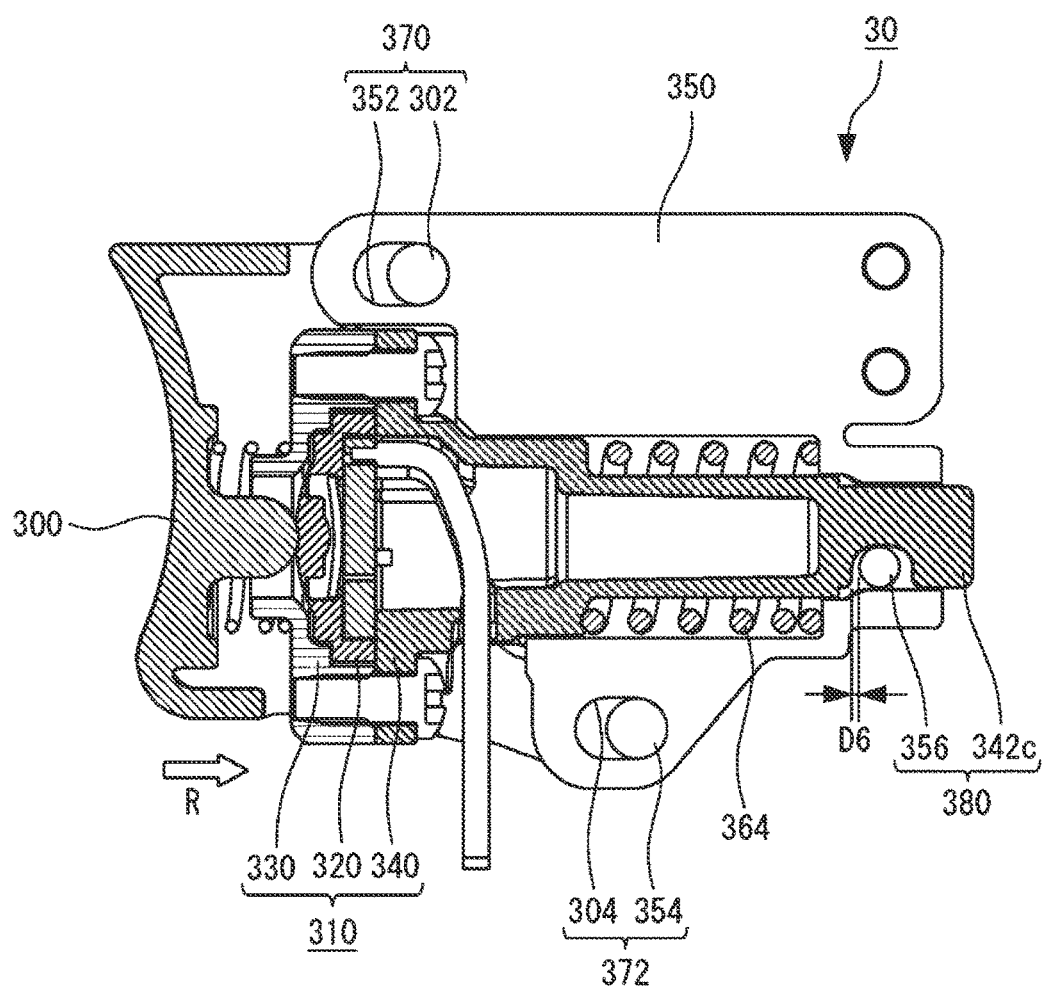
FIG. 6 is a sectional view illustrating a motion example of the switch.

Next, a motion example of the switch 30 will be described with reference to FIGS. 3 and 6. FIG. 6 illustrates an example of a motion of pulling the switch 30. In a state before the trigger 300 is pressed by the user, the trigger 300 and the sealing cover 322 are separated by the distance D1 from each other, and the pressure-sensitive conductive elastic member 324 and the substrate 326 are separated by the distance D2 from each other. In this case, the load sensor 320 is in a non-conductive state. Before the trigger 300 is pressed, the coil spring 364 biases the sensor unit 310 toward the trigger 300, but the hook portion 342c is locked by the protrusion 356. In this manner, it is possible to prevent the sensor unit 310 from coming off from the fixing member 350.

When the user performs the pressure operation on the trigger 300, the trigger 300 moves in the pressing direction R, and the protrusion 300a of the trigger 300 abuts on the pressure portion 322a of the sealing cover 322 and presses the pressure portion 322a. When the trigger 300 is further pressed, the pressure portion 322a of the sealing cover 322 presses the pressure-sensitive conductive elastic member 324. In this manner, the pressure-sensitive conductive elastic member 324 is elastically deformed and bent to contact the substrate 326. That is, the trigger 300 (protrusions 302 and 304) moves by the displacement amount allowed in the distances D1 and D2 in the pressing direction R.

As illustrated in FIG. 6, when the user further performs the pressure operation on the trigger 300, and a load equal to or more than the attachment load of the coil spring 364 is applied to the trigger 300, the coil spring 364 is compressed, and the sensor unit 310 containing the load sensor 320 moves in the pressing direction R (rearward). When the sensor unit 310 moves by the distance D3, the movement of the trigger 300 including the protrusions 302 and 304 is regulated by the long holes 352 and 354. That is, the trigger 300 reaches a stroke limit before the sensor unit 310 reaches a stroke limit. In this manner, it is possible to prevent a load equal to or more than that of the coil spring 364 from being applied to the load sensor 320.

Even in a case where the trigger 300 moves by the maximum distance which is regulated by the regulating parts 370 and 372, the protrusion 356 in the hook portion 342c is in the state of being movable by a distance D6. That is, the sensor unit 310 is configured to be movable with a margin of the distance D6 to the fixing member 350. In this manner, it is possible to prevent the damage and the like of the load sensor 320 even in a case where an excessive load is applied to the load sensor 320.

[Block Configuration Example of Electric Tool 10]

Figure 7:
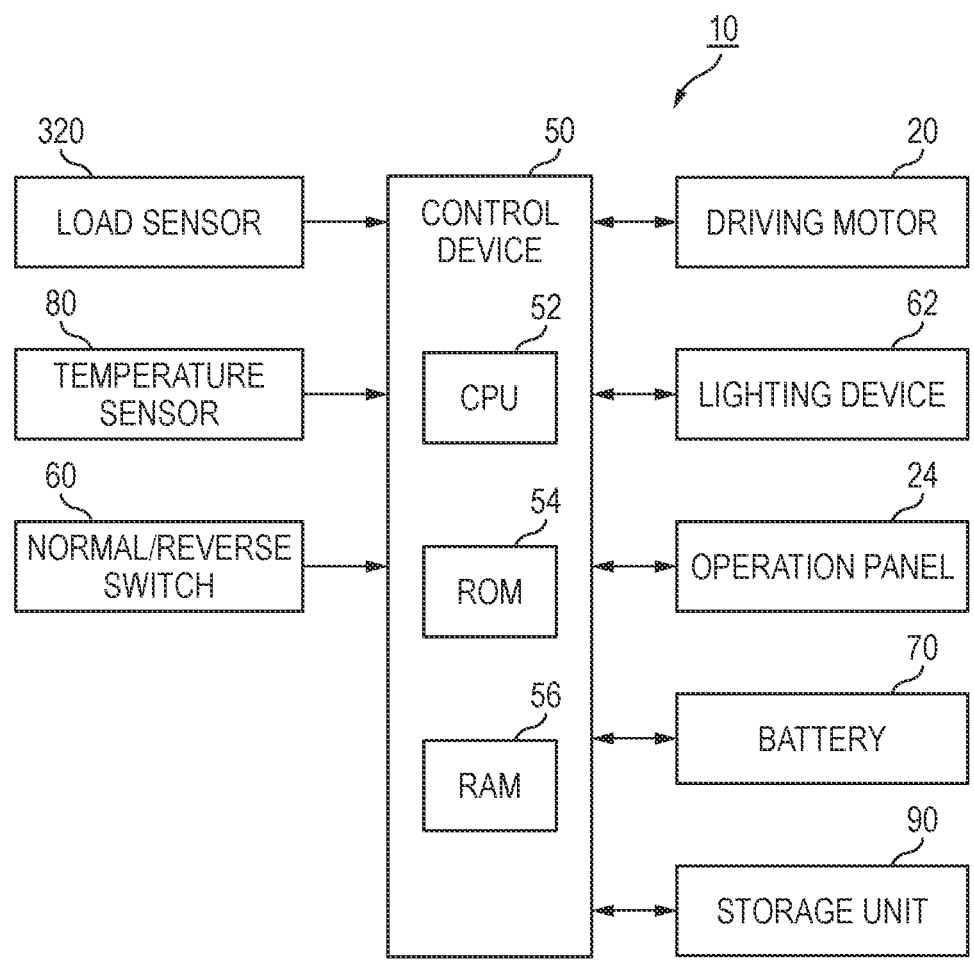
FIG. 7 is a block diagram illustrating a functional configuration example of the electric tool.

FIG. 7 is a block diagram illustrating an example of a functional configuration of the electric tool 10. As illustrated in FIG. 7, the electric tool 10 includes the control device 50 (controller) for controlling the entire motion of the electric tool 10. The control device 50 is a microcomputer which mainly includes a CPU (Central Processing Unit) 52, a ROM (Read Only Memory) 54, and a RAM (Random Access Memory) 56. The control device 50 executes a correction motion of correcting an error, which is generated by the deterioration of the switch 30 and the like, a control of driving the motor 20, and the like according to a program stored in advance in the ROM 54 and the like.

The control device 50 is connected with the load sensor 320, the temperature sensor 80, the normal/reverse switch 60, the motor 20, a lighting device 62, the operation panel 24, the battery 70, and a storage unit 90.

The load sensor 320 detects a load corresponding to a pressing force of the user with respect to the trigger 300, and supplies a detection signal based on the detection to the control device 50. The temperature sensor 80 detects a temperature (ambient temperature) of the load sensor 320, and supplies temperature information to the control device 50. The normal/reverse switch 60 supplies a switch signal based on a positive rotation/reverse rotation switch operation of the user with respect to the control device 50.

The motor 20 is driven to rotate based on a driving signal supplied from the control device 50. The lighting device 62 is formed, for example, of a plurality of LEDs provided in the electric tool body 12, and is lighted on or is lighted off based on the driving signal supplied from the control device 50. The operation panel 24 switches a display based on the instruction of the control device 50.

The battery 70 supplies power to the components such as the control device 50. The storage unit 90 is formed, for example, of a nonvolatile semiconductor memory, and stores a load-resistance value feature indicating a load and a resistance value as a reference value, and a table storing a plurality of load-resistance value features indicating the load and the resistance value set at each temperature. For example, the load-resistance value feature can be set at each of −10° C., 0° C., 25° C., 30° C., and 40° C. as a temperature. The load-resistance value feature may be set as a function formula in advance, so that a resistance value with respect to a load is computed through real time computation.

[Load-Resistance Value Feature]

Figure 8:
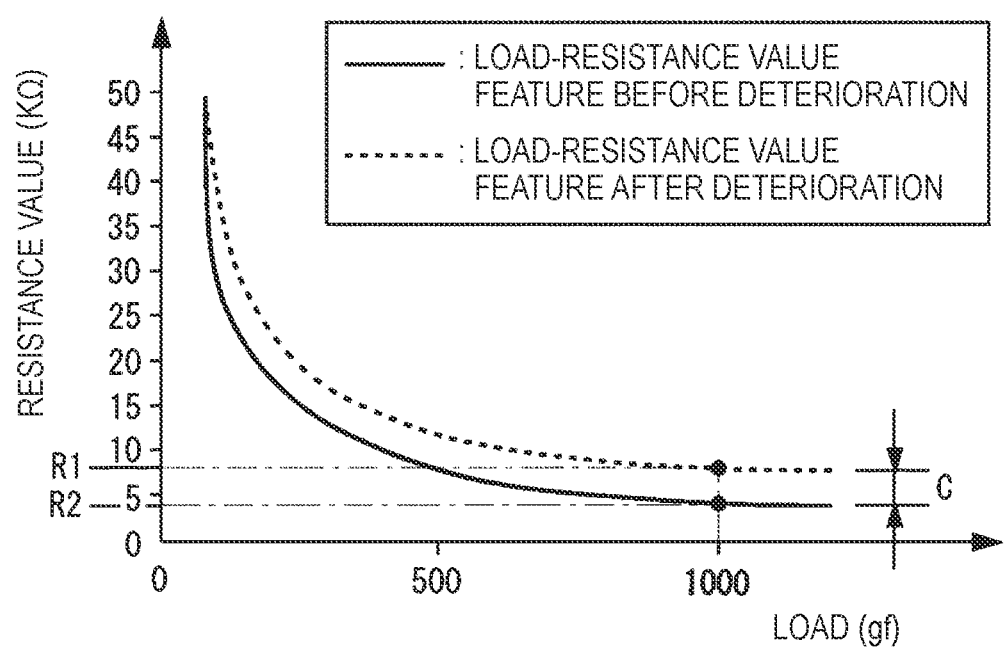
FIG. 8 is a graph illustrating load-resistance value features before and after deterioration of the load sensor.

The load sensor 320 has a problem that the output feature with respect to a load is changed due to the deterioration or the temperature variation. FIG. 8 is a graph illustrating an example of a relation between a load detected by the load sensor 320 and a resistance value. In FIG. 8, a solid line indicates a load-resistance value feature (reference value) before the deterioration of the load sensor 320, and a broken line indicates a load-resistance value feature after the deterioration of the load sensor 320. The axis of ordinates indicates the resistance value, and the axis of abscissas indicates the load.

As illustrated in FIG. 8, in the load-resistance value feature before the deterioration, when a load detected by the load sensor 320 is larger, a resistance value with respect to the load becomes smaller. On the other hand, in the load-resistance value feature after the deterioration, when the load detected by the load sensor 320 is larger, the resistance value becomes smaller. However, the resistance value with respect to the load is declined more insensitively compared with the case before the deterioration, and the resistance value is larger than the case before the deterioration. As a result, a rotational speed of the motor 20 is increased by a small load, and thus there is a problem that it is not possible to obtain the accurate rotational speed of the motor 20 corresponding to the load.

In this regard, in this embodiment, a correction on the output error generated by the deterioration of the load sensor 320 and the like is performed in such a manner that the resistance value with respect to a certain load is detected, the difference between the detected resistance value and the reference value is set as a correction value, and then the correction value is reflected on the resistance value with respect to the load detected by the load sensor 320. Herein, the certain load in this embodiment indicates a maximum load obtained through the coil spring 364 as a load adjusting mechanism.

For example, as illustrated in FIG. 8, in a case where the certain load is set to 1000 (gf), it is obtained a resistance value R1 in a case where the load detected by the load sensor 320 reaches approximately 1000 (gf). Continuously, a difference C between a resistance value R2 as a reference value in the case of a load of 1000 (gf) and the obtained resistance value R1 is calculated. The difference C is set as a correction value for correcting the output difference generated due to the deterioration and the like. The load-resistance value feature before the deterioration and the load-resistance value feature after the deterioration are deviated by the almost same deviation amount, and thus the same correction value can be also used to a resistance value with respect to another load. Of course, the calculated correction value may be further corrected in each detected load. The certain load may be set arbitrarily with the adopted coil spring 364 and the like, and is not limited to the above-described 1000 (gf).

Herein, the determination on whether the load applied to the load sensor 320 reaches the certain load can be performed as follows. When a predetermined load or more is applied, the electric tool 10 performs a screw fastening by the hammer 44 applying a rotational strike to the anvil 16. Since the impact generated by the strike is transmitted also to the load sensor 320, the signal of the load detected by the load sensor 320 is periodically varied. At this time, the load sensor 320 becomes more stable when the trigger 300 is grasped more strongly. Accordingly, when the trigger 300 is grasped strongly, the variation (amplitude) of the resistance value detected by the load sensor 320 becomes small, and when the trigger 300 is grasped weakly, the variation (amplitude) of the resistance value becomes large. In this regard, in this embodiment, in consideration with the change of the amplitude of the resistance value according to a force of holding the trigger 300, in a case where the amplitude of the resistance value is equal to or less than a preset threshold value, it is determined that the load applied to the load sensor 320 reaches a certain load (maximum load).

[Motion Example (First) of Electric Tool 10]

Figure 9:
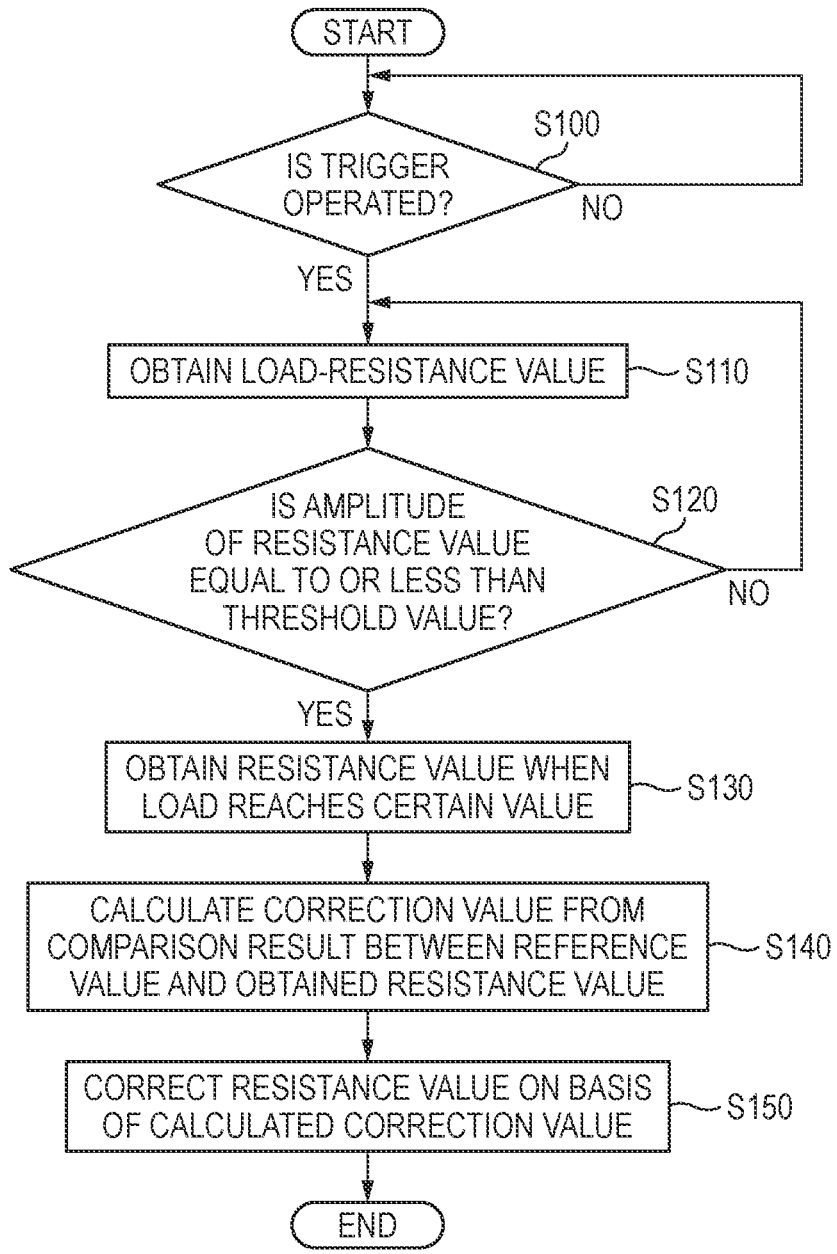
FIG. 9 is a flowchart illustrating a motion example of the electric tool in the case of considering the deterioration of the load sensor.

FIG. 9 is a flowchart illustrating an example of a correction motion of the electric tool 10 in the case of considering the deterioration of the load sensor 320. The correction motion (to be described later) of the electric tool 10 is performed when the control device 50 (CPU 52) executes the program stored in the ROM 54.

As illustrated in FIG. 9, in Step S100, the control device 50 determines whether the user operates the trigger 300. In a case where it is determined that the user does not operate the trigger 300, the control device 50 stands by until the user operates the trigger 300. On the other hand, in a case where it is determined that the user operates the trigger 300, the control device 50 progresses to Step S110.

In Step S110, the load sensor 320 detects the load corresponding to the pressing force of the user with respect to the trigger 300. The control device 50 calculates the resistance value with respect to the load detected by the load sensor 320. After Step S110 is ended, the procedure proceeds to Step S120.

In Step S120, the control device 50 determines whether the amplitude of the calculated resistance value is equal to or less than the preset threshold value. That is, it is determined whether the load detected by the load sensor 320 reaches a certain load (maximum load). In a case where the amplitude of the obtained resistance value is not equal to or less than the threshold value, that is, a case where the amplitude of the resistance value exceeds the threshold value, the control device 50 determines that the load does not reach a certain value, and progresses to Step S110. The control device 50 continuously monitors the amplitude of the resistance value. On the other hand, in a case where it is determined that the amplitude of the obtained resistance value is equal to or less than the threshold value, the control device 50 progresses to Step S130.

In Step S130, the control device 50 obtains the resistance value in a case where the load reaches the certain value. That is, it is obtained the resistance value in a case where the maximum load is applied to the load sensor 320 by the pressure operation of the user with respect to the trigger 300. After Step S130 is ended, the procedure proceeds to Step S140.

In Step S140, the control device 50 reads the preset reference value (load-resistance value feature) from the storage unit 90, and calculates the correction value based on the comparison result between the read reference value and the obtained resistance value. The reference value is a normal resistance value of the load sensor 320 obtained, for example, before the deterioration occurs in the load sensor 320 (before handling). After Step S140 is ended, the procedure proceeds to Step S150.

In Step S150, the control device 50 corrects the resistance value (output), which is detected by the load sensor 320, corresponding to the pressure of the user with respect to the trigger 300 by using the calculated correction value. The control device 50 can perform the rotation driving on the motor 20 without being affected by the deterioration of the load sensor 320 by outputting a voltage signal based on the corrected resistance value to the motor 20.

[Motion Example (Second) of Electric Tool 10]

Figure 10:
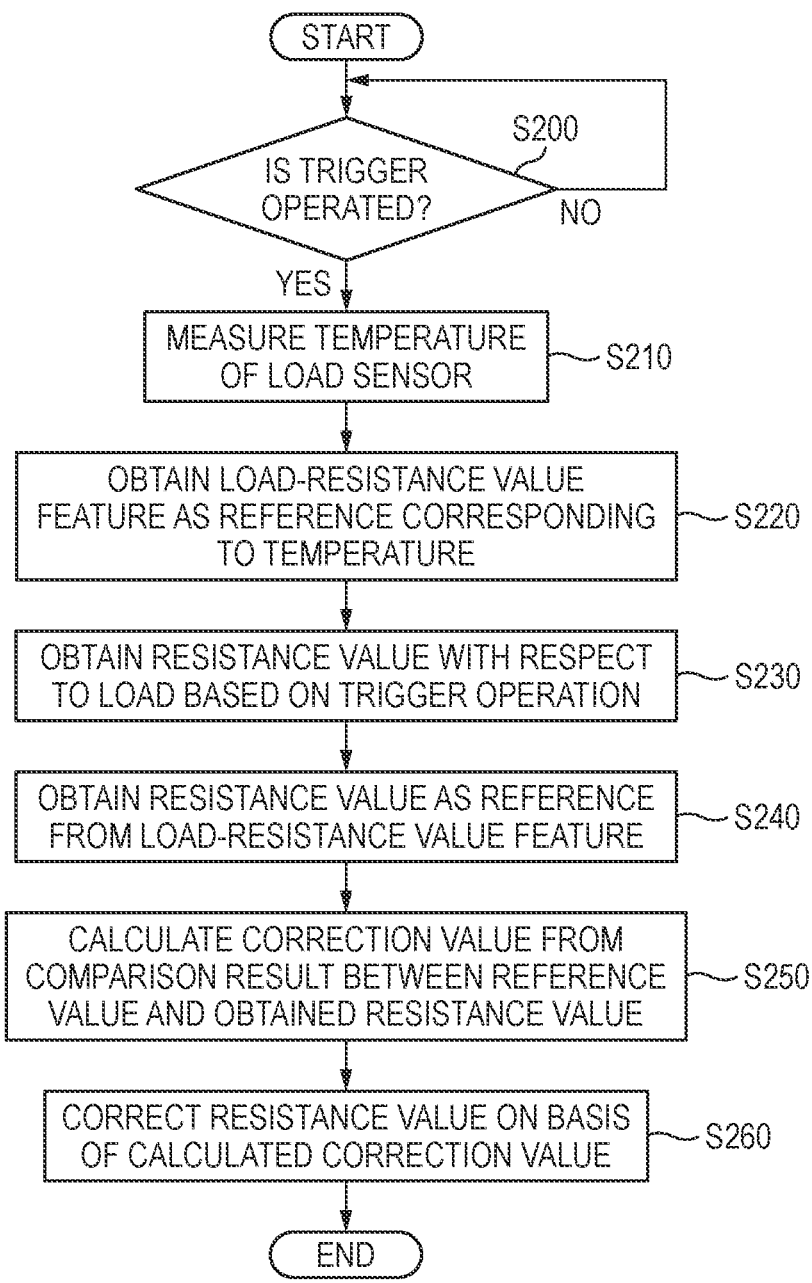
FIG. 10 is a flowchart illustrating a motion example of the electric tool in the case of considering temperature variation.

FIG. 10 is a flowchart illustrating an example of the correction motion of the electric tool 10 in the case of considering the temperature variation of the load sensor 320. This correction motion may be preferably applied to, for example, a case where the load of the load sensor 230 does not reach a certain load, and after the operation is performed in a place with a high temperature, and then the operation is performed after moving to a place with a low temperature. For example, the correction motion may be preferably applied also to a case where in a season with an extreme temperature difference, the operation is performed at day, and then the operation is performed at night.

The correction motion (to be described later) of the electric tool 10 is performed when the control device 50 (CPU 52) executes the program stored in the ROM 54. Specifically, in Step S200, the control device 50 determines whether the user operates the trigger 300. In a case where it is determined that the user does not operate the trigger 300, the control device 50 continuously monitors whether the user performs the operation. On the other hand, in a case where it is determined that the user operates the trigger 300, the control device 50 progresses to Step S210.

In Step S210, according to activation of the control device 50, the temperature sensor 80 measures the temperature of the load sensor 320. After Step S210 is ended, the procedure proceeds to Step S220.

In Step S220, the control device 50 selects a load-resistance value feature (reference value), which is a reference corresponding to the temperature of the load sensor 320 measured by the temperature sensor 80, among a plurality of load-resistance value features stored with respect to respective temperatures, and reads the load-resistance value feature. After Step S220 is ended, the procedure proceeds to Step S230.

In Step S230, the control device 50 obtains a load corresponding to the pressing force of the user with respect to the trigger 300 from the load sensor 320, and calculates a resistance value with respect to the obtained load. The examples thereof include a case where the trigger 300 starts the first movement, and a case where the trigger 300 is pulled in the state of not fastening the screw. After Step S230 is ended, the procedure proceeds to Step S240.

In Step S240, the control device 50 obtains a resistance value, which is a reference corresponding to a load matching the load corresponding to the pressing force of the user, based on the load-resistance value feature read from the storage unit 90. After Step S240 is ended, the procedure proceeds to Step S250.

In Step S250, the control device 50 calculates the correction value by comparing between the resistance value with respect to the load corresponding to the pressing force of the user and the reference value of the resistance value obtained from the load-resistance value feature. After Step S250 is ended, the procedure proceeds to Step S260. A comparison between an output value of the load sensor 320 and the reference value may be performed, and in a case where the output is separated largely from the reference value, it may be determined and notified that the output is abnormal. As a notification means, for example, voice or a buzzer may be adopted, and a lighting display using LED and the like may be adopted. In this manner, it is possible to check whether abnormality occurs in the electric tool 10.

In Step S260, the control device 50 corrects the resistance value, which is detected by the load sensor 320, corresponding to the pressure of the user with respect to the trigger 300 by using the calculated correction value. The control device 50 can perform the rotation driving on the motor 20 without being affected by the temperature variation by outputting a voltage signal based on the corrected resistance value to the motor 20.

As illustrated above, in this embodiment, the output correction is performed based on the difference between the resistance value with respect to the detected load, and the reference value. Therefore, it is possible to obtain a stabilized operation feeling of the switch 30 without being affected by the deterioration of the load sensor 320 or the temperature variation in the use environment. For example, in the related art, in the case of using the rubber load sensor 320, the hardness of the rubber may be changed by the temperature variation, and the desired rotation of the motor 20 may be not obtained. However, in this embodiment, the load-resistance value feature as a reference is stored at each environmental temperature, and the correction corresponding to the temperature is performed, so that it is possible to perform a highly precise operation regardless of the temperature variation.

In this embodiment, for example, at the time of starting to use the electric tool 10, the correction motion illustrated in FIG. 10 can be performed, and after starting to use the electric tool 10, the correction motion illustrated in FIG. 9 can be performed. In this manner, even in a case where the load sensor 320 does not reach a certain load similarly with the time of starting to use the electric tool 10, it is possible to accurately correct the resistance value with respect to the load. In the correction motions illustrated in FIGS. 9 and 10, only one correction motion thereof may be embedded to the electric tool 10, and both the correction motions may be embedded to the electric tool 10.

The technical range of the present invention is not limited to the above-described embodiments, and the above-described embodiments may be modified in various forms without departing from the scope of the present invention. The description has been given about an example that the rubber load sensor of the pressure-sensitive type is used as an example of the load sensor 320. Additionally, the present invention may be applied also to the case of using a semiconductor-type load sensor, or a strain gauge-type load sensor.

In the above-described embodiment, in a case where the output correction is performed in consideration of the temperature variation, the load-resistance value feature and the function formula are stored at each temperature. However, the invention is not limited thereto. For example, a plurality of load-resistance value features (output feature) or function formulas may be stored in correspondence with the preference of the user. Specifically, it is considered that the correction motions are performed which correspond to a user who desires to obtain a strong output with a light pull operation, a user who desires to obtain, adversely, a corresponding output with a heavy pull operation, and the like.

When an operation is performed finely, the correction may be performed to be sensitive to the sensitivity of the trigger 300 even during normal time, thereby improving the response of the electric tool 10.

Without depending on a pulling method of the trigger 300, the load-output feature may be changed according to load areas by performing a correction, which allows the driving of starting a rotation slowly at the beginning of pulling and making the rotation gradually faster, and a correction of making the rotation reach a maximum speed rapidly. In order that a proper use in correspondence with an operation target can be easily performed, it is considered that a correction of setting the upper limit of the output (rotational speed) is performed to obtain a predetermined output without depending on a pulling method of the trigger 300. At this time, it may be configured that the feature in correspondence with the preference of the user is selectable from a plurality of output features which are stored in advance. When it is set to store an arbitrary load, it is possible to improve usability.

In the above-described embodiment, the output at the time of the certain load is corrected, but the invention is not limited thereto. For example, when it is satisfied at least one condition of the preset operating time of the electric tool 10 and the preset number of times of the operation, the output with respect to the load detected by the load sensor 320 may be corrected. In this case, the correction value is preferably set in proportion to the operating time and the number of times of the operation.

In the regulating parts 370 and 372 of the above-described embodiment, the relation between the protrusions 302 and 304 and the long holes 352 and 354 may be configured adversely. Similarly, the protrusion 356 and the hook portion 342c of the regulating part 380 may be configured adversely. The method of determining whether the load applied to the load sensor 320 reaches a certain load is not limited to the above-described embodiment. A displacement sensor may be used to detect the maximum amount of the stroke of the trigger 300.

(1) A tool comprising:
  a switch that is configured to cause an electric component to operate; and
  a controller,
  wherein the switch includes:
    a switch manipulation part that is configured to manipulate the switch; and
    a load sensor that is configured to detect a load corresponding to a pressing force according to a manipulation of the switch manipulation part, and
  wherein the controller is configured to correct an output corresponding to the load detected by the load sensor, and
    wherein the switch is configured to cause the electric component to operate based on the output corrected by the controller.

(2) The tool according to (1), wherein
  the controller is configured to correct the output of the load sensor based on comparison between the output of the load sensor in a predetermined load and a reference value.

(3) The tool according to (2), wherein
  the controller is configured to correct the output of the load sensor based on a load in a case where an output waveform amplitude of the load sensor in the predetermined load is a threshold value or less than the threshold value.

(4) The tool according to (2) or (3), further comprising:
  a load adjusting mechanism that is configured to apply the predetermined load to the load sensor.

(5) The tool according to (4), wherein
  the load adjusting mechanism includes an elastic member which is elastically deformed when a prescribed load or more is applied to the load sensor, and
  the load adjusting mechanism is configured to be movable in a direction of the load applied by a pressure operation.

(6) The tool according to any one of (1) to (5), further comprising:
  a temperature measurement part, wherein
  the controller is configured to correct the output corresponding to the load detected by the load sensor based on a temperature of the load sensor measured by the temperature measurement part, or based on an ambient temperature measured by the temperature measurement part.

(7) The tool according to (6), wherein
  the temperature measurement part is provided inside a sensor housing member in which the load sensor is housed.

(8) The tool according to any one of (1) to (7), wherein
  the controller is configured to select a specific reference value from a plurality of reference values, and is configured to correct the output of the load sensor based on the selected reference value.

(9) The tool according to any one of (1) to (8), wherein
  the load sensor includes:
    a pressure-sensitive conductive elastic member in which conductive particles are dispersed in a switch manipulation material, and a substrate which is configured to conduct current by the pressure-sensitive conductive elastic member.

(10) The tool according to (1), wherein the controller is configured to correct the output of the load sensor based on at least one of operating time of the tool and the number of times of manipulations.

What is claimed is:

1. An electric tool comprising:
a switch that is configured to cause an electric component to operate; and
a controller,
wherein the switch includes:
   a switch manipulation pant that is configured to manipulate the switch; and
   a load sensor that is configured to detect a load corresponding to a pressing force according to a manipulation of the switch manipulation part, and
wherein the controller is configured to correct an output of the load detected by the load sensor for the pressing force, and wherein the controller is further configured to determine a difference between the output of the load sensor for a predetermined load and a reference value, and to correct the output of the load sensor for the pressing force based on the difference between the output of the load sensor for the predetermined load and the reference value, and,
wherein the switch is configured to cause the electric component to operate based on the output corrected by the controller.

2. The tool according to claim 1, wherein the controller is configured to correct the output of the load sensor for the load corresponding to the pressing force in response to a determination that an output waveform amplitude of the load sensor for the predetermined load is equal to or less than a threshold value.

3. The tool according to claim 1, further comprising:
a load adjusting mechanism that is configured to apply the predetermined load to the sensor.

4. The tool according to claim 3, wherein
the load adjusting mechanism includes an elastic member which is elastically deformed when a prescribed load or more is applied to the load sensor, and
the load adjusting mechanism is configured to be movable in a direction of the load applied by a pressure operation.

5. The tool according to claim 1, further comprising:
a temperature measurement part, wherein
the controller is configured to correct the output, corresponding to the load detected by the load sensor based on a temperature of the load sensor measured by the temperature measurement part, or based on an ambient temperature measured by the temperature measurement part.

6. The tool according to claim 5, wherein
the temperature measurement part is provided inside a sensor housing member in which the load sensor is housed.

7. The tool according to claim 1, wherein
the controller is configured to select a specific reference value from a plurality reference values, and is configured to correct the output of the load sensor based on the selected reference value.

8. The tool according to claim 1, wherein
the load sensor includes:
   a pressure-sensitive conductive elastic member in which conductive particles are dispersed in a switch manipulation material, and
   a substrate which is configured to conduct current by the pressure-sensitive conductive elastic member.

9. The tool according to claim 1, wherein
the controller is configured to correct the output of the load sensor based on at least one of operating time of the tool and a number of manipulations.

10. The tool according to claim 1, further including a storage unit which stores the reference value with the reference value corresponding to an expected output value of the load sensor for the predetermined load without deterioration due to use and/or temperature, and the controller is configured to correct the output of the load sensor for the load corresponding to the pressing force based on the difference between the output of the load sensor for the predetermined load and the reference value so that after deterioration due to use and/or temperature the output corrected by the controller for the load corresponding to the pressing force more closely matches an expected output of the load sensor for the pressing force without deterioration due to use and/or temperature.

11. The tool according to claim 10, wherein the reference value and the output of the load sensor are resistance values.

* * * * *